United States Patent Office  3,458,395
Patented July 29, 1969

3,458,395
PRODUCTION OF CELLULOSIC FIBER SHEETS CONTAINING COATED TITANIUM DIOXIDE PIGMENTS
Ian Nicol Stalker, 45 Heathcote Drive, East Grinstead, Sussex, England
No Drawing. Continuation-in-part of application Ser. No. 377,489, June 24, 1964. This application Aug. 19, 1968, Ser. No. 753,706
Claims priority, application Great Britain, July 10, 1963, 27,245/63
Int. Cl. D21h *3/22;* D21d *3/00*
U.S. Cl. 162—175                                                   15 Claims

ABSTRACT OF THE DISCLOSURE

In the production of cellulosic fiber sheets, titanium dioxide and aminated polysaccharide are introduced as a free-flowing material, the aminated polysaccharide being present as a dried coating on the pigment particles. The coated titanium dioxide pigment can be stored and/or handled as a free-flowing pigmentary material, thereby eliminating the need for liquid handling or multiple additions by the ultimate user.

Related application

This application is a continuation-in-part of application Ser. No. 377,489, filed June 24, 1964, and now abandoned.

The present invention relates to improved titanium dioxide pigment, particularly to pigment for use in the pigmentation of sheets of cellulose fibers, for example, paper.

Titanium dioxide is widely used in the pigmentation of cellulose fiber sheets, such as paper sheets. However, the retention of titanium dioxide added during the manufacture process is not as high as desired and when the pigment is added to a pulp of cellulose fibers, for example at the beating stage, or later, in the manufacture of paper, some of the pigment is retained with the fibers during sheet making and the rest remains in suspension. Most of the titanium dioxide which is not retained is normally recirculated to the addition stage. Because only a proportion of the titanium dioxide is retained in the sheet, it is necessary to add to the fiber pulp more titanium dioxide than it is intended to include in the finished product. Such a process is wasteful since, although the titanium dioxide which is not retained is recirculated to the addition stage, some of the recirculating suspension must be discharged and thus there is a constant wastage of pigment. Not only is this uneconomic, but a serious effluent problem may be created.

It has been known that the addition of various polysaccharides to the paper pulp improves the strength of the final paper. In U.S. Patent 2,136,296, it was disclosed that aminated cellulose compounds could be included in aqueous dispersions of titanium oxide and other fillers for the coating of paper. U.S. Patent 2,813,093 and U.S. Patent 3,320,118 disclose the use of aminated starches for the purpose of increasing paper strength and improving retention of filler materials in the paper. The superiority of the aminated polysaccharides over polysaccharides generally is discussed in detail in these patents.

It has now been found that combination of the aminated polysaccharides with titanium dioxide pigment in a particular manner will provide not only improved pigment retention, but also a significant improvement in the number of the other properties related to the final paper product, as well as to the economy of production.

It is an object of the present invention to provide a tatanium dioxide pigment which is better retained when added during the production of sheets of cellulose fibers.

It is also an object of the invention to provide processes for the production of such a pigment.

Accordingly, the present invention is a titanium dioxide pigment suitable for use in the pigmentation of sheets of cellulose fibers comprising titanium dioxide particles carrying an aminated polysaccharide.

It is believed that part at least of the aminated polysaccharide is adsorbed onto the particles.

The invention also comprises sheets of cellulose fibers containing titanium dioxide particles, the surface of which carry an aminated polysaccharide.

The sheets of cellulose fibers for use in which the pigments of the present invention are particularly suitable are normally sheets of paper.

The titanium dioxide particles may be of the rutile or anatase form and generally consist of material having a means weight particle size in the range of 0.15 to 0.35 micron, particularly in the range of 0.2 to 0.3 micron. Titanium dioxide pigments incorporated into paper are generally uncoated anatase pigments but for special purposes, for example in papers for use in paper laminates, coated rutile pigments are normally used, for example pigments coated with hydrous oxides of titanium, aluminium, zirconium, cerium and/or silicon and both uncoated and coated pigments are within the scope of the present invention.

The aminated polysaccharide carried by the titanium dioxide particles is a polymer of high molecular weight, for example at least 750, particularly at least 10,000 and generally of at least 100,000, which is composed of carbohydrate molecules and carrying at least one amine group which may be a primary, secondary or tertiary group but which is preferably a tertiary group. It is preferred that the polysaccharide carries a number of such amine groups along the chain. Such aminated polysaccharides normally contain amine groups equivalent to at least 0.05%, particularly at least 0.1% and preferably at least 0.2% by weight of nitrogen.

Particularly suitable polysaccharides are aminated galacto-mannans; starches and celluloses. These compounds are commercially available and can be made by treating a polysaccharide with a chlorinated aliphatic amine under alkaline conditions. Examples of commercially available aminated polysaccharides are "Jaguar Plus" (an aminated galacto-mannan) and "Cato 8" (an aminated starch).

Any of the aminated polysaccharides described in the aforementioned patents are useful in accordance with the present invention provided they otherwise meet the above requirements. For example, "Cato 8" is produced in accordance with the aforementioned Patent 2,813,093 and encompassed by the claims thereof. This aminated starch has a molecular weight on the order of 100,000 and has a nitrogen content of approximately 0.25%. In a typical example, the aminated polysaccharide may correspond to the reaction product of tapioca starch with β-diethyl amino ethyl chloride hydrochloride, as described in Examples III and X of the said U.S. Patent 2,813,093. This, however, is merely one example of a useful material, and the other products encompassed in said patent are equally useful. It is to be understood that the present invention does not comprise the use of any particular aminated polysaccharides other than those meeting the requirements specified above, but in the manner of using these and in their application in the specific manner to titanium dioxide pigments.

The aminated polysaccharide may be applied to the titanium dioxide particles in any suitable manner, for example it may be added as a particulate solid during dry or wet milling of the titanium dioxide. Dry milling may conveniently be carried out in a fluid energy mill, swing hammer mill, ring roller mill or ball mill and wet milling in a sand mill or ball mill or impeller mill.

Alternatively, the aminated polysaccharide may be dissolved in water (in which they generally form a colloidal suspension) and this may be added to the dry pigment followed by milling of the mixture or the dry polysaccharide may be added to a dispersion of the pigment in water followed by drying or milling and drying of the mixture.

Sufficient aminated polysaccharide may be added to the titanium dioxide pigment to allow the latter to retain at least 0.25% and preferably at least 1% by weight of the polysaccharide in the dry state. The retention of more than about 5% on the titanium dioxide particles does not appear to bestow a sufficient improvement in properties to warrant the use of such quantities of polysaccharide and, in general, it is preferred not to use more polysaccharide than would result in a retention of about 2.5% by weight.

In some cases the addition of polysaccharide tends to cause the titanium dioxide particles to form aggregates and it is advisable to mill the pigment, preferably by sand milling, during or immediately after, the addition of the polysaccharide to break up such aggregates.

The pigment carrying the polysaccharide may be added to the process for the production of sheets of cellulose fibers at any convenient stage, for example it may be added as a solid at the beater stage in the production of paper or it may be added as a slurry (if desired in the presence of a surface active agent) at the beating stage or at any intermediate point before the fibers are formed into the sheet.

It is common practice to add resin (as a size) and an aluminium salt, particularly aluminium sulphate, to cellulose fibers during the production of paper. The aluminium salt improves the retention of the titanium dioxide and of the resin. It has been found that the pigment of the present invention is well retained even in the absence of the aluminium salt.

Where an aluminium salt such as aluminium suphate is added to the paper during its manufacture, the titanium dioxide pigment has commonly been added before the aluminium sulphate and the pigments of the present invention may also be added at this stage, if desired. However, where the titanium dioxide pigment carries an aminated starch, better results have generally been obtained if the pigment is added after the addition of the aluminium sulphate.

Where paper is intended for use in paper laminates, it has recently been proposed to use for its pigmentation a rutile pigment which has been calcined, coated with hydrous metal and metalloid oxides and recalcined. Such pigments, although providing paper laminates showing increased resistance to disclororation when exposed to light in the ultraviolet wavelength range, are particularly poorly retained during the manufacture of the paper. Such pigments, when carrying an aminated polysaccharide according to the present invention, show a much improved retention.

In the examples which follow, the percentage contrast ratio of the paper is estimated by means of a photo-electric cell and galvanometer. The latter is calibrated under standard conditions to give a value of 0 for light reflection from a black tile and of 100 for light reflection from magnesium oxide. A white tile is then taken which reflects sufficient light to give a reading of 89 on the galvanomter under similar conditions. The paper is placed over the black tile and the light reflected from the paper under the standard conditions measured by means of the photo-electric cell and galvanometer. This process is repeated for the paper when placed over the white tile. The result is expressed as:

$$\frac{\text{Reflectance over black tile}}{\text{Reflectance over white tile}} \times 100$$

Example 1

An uncoated anatase titanium dioxide pigment was dispersed in water by milling to give a slurry containing 300 g./litre $TiO_2$ and during milling 1.4% by weight (on $TiO_2$) of dry powdered aminated galacto-mannan (containing 0.6% nitrogen) was slowly added. Milling was continued for 30 minutes after which a substantial proportion of the polysaccharide was adsorbed onto the pigment causing it to flocculate. The slurry was filtered, dried at 100° C. and dry milled.

Bleached sulphite wood pulp was beaten to a Canadian Freeness (as described in "Cellulose Pulp" by Grant 1958 edition, L. Hill Limited, page 403) of 120 ml. and added to a laboratory disintegrator at 0.5% solids. While stirring 2% rosin size; 4% of titanium dioxide pigment (prepared as above) as a concentrated aqueous slurry and 4% aluminium sulphate (as a 10% aqueous solution) were added to the pulp. The percentages given are by weight relative to the weight of dry fiber.

The product was then diluted and paper sheets were made on a British Standard sheet machine to give a substance of 50 g./square meter. The contrast ratio and pigment content of the resulting sheet were estimated.

The process was repeated using an uncoated anatase pigment *not* carrying an aminated polysaccharide for comparison. The results are shown in Table I.

TABLE I

| Pigment | Percent $TiO_2$ Retained | Percent Contrast Ratio |
|---|---|---|
| Pigment *not* carrying an aminated polysaccharide | 54 | 80.0 |
| Pigment carrying an aminated polysaccharide | 77 | 82.4 |

Example 2

A quantity of a rutile titanium dioxide pigment which had been coated with alumina, titania and silica and recalcined was divided into two parts. One was mixed in a hammer mill with 0.8% by weight of an aminated galacto-mannan (containing 0.6% nitrogen).

Cellulose pulp was beaten to a Canadian Freeness of 500 ml. and diluted to a consistency of 1.25%. The mixture thus obtained was divided into 2 litre portions and to these were added in a disintegrator weights as described below of *either* the $TiO_2$ pigment carrying the aminated galacto-mannan *or* the $TiO_2$ pigment to which no addition had been made, followed by 0.5 ml. of a 10% aqueous solution of aluminium sulphate. The resulting mixtures were diluted to 5 litres, various volumes were taken and formed into paper sheets in a British Standard machine and dried.

Papers made from each pigment having a substance of 220 g./litre and an ash content of 22% were selected and the amounts of pigment required to give these were noted. The results are given below.

| Pigment | Weight of Pigment Used, g. | Percent Retention |
|---|---|---|
| Pigment carrying an aminated galacto-mannan | 9.6 | 77 |
| Pigment *not* carrying an aminated galacto-mannan | 21.75 | 34 |

Example 3

The processes described in Example 2 were repeated with the exception that no aluminium sulphate was added. The amounts of the pigments used to give a paper of a substance of 220 g./sq. meter and an ash content of 22% were as follows.

| Pigment | Weight of Pigment Used, g. | Percent Retention |
|---|---|---|
| Pigment carrying an aminated galacto-mannan | 14.0 | 51 |
| Pigment *not* carrying an aminated galacto-mannan | 90.1 | 8 |

Example 4

Repetition of Examples 1 through 3 above (using the aminated starches of Examples I–VIII of U.S. 2,813,093 provides equivalent desirable results with high pigment retention and contrast ratio and with efficient usage of the aminated polysaccharide.

Examples 5–9

A kilogram of pigmentary anatase $TiO_2$ was added, with stirring, to 1.5 litres of water. To the resulting dispersion was slowly added 200 ml. of an aqueous colloidal dispersion containing 1% of aminated polysaccharide (Jaguar Plus).

The process was repeated with four other kilogram lots of the anatase pigment except that 400 ml., 600 ml., 800 ml. and 1400 ml. of the 1% aqueous colloidal dispersion of the aminated polysaccharides were added respectively.

Magnesium sulphate heptahydrate (10 ml. of 10% w./v. aqueous solution) was added to each mixture (to assist in filtration) and each mixture was filtered and the filter cake was washed, dried at 10° C. to 120° C. and fluid energy milled.

The coated pigments prepared as described above were incorporated separately into paper as follows.

Equal parts of bleached sulphite and sulphate pulps were beaten together to 300 ml. Canadian Standard Freeness and the resulting stock diluted to 1% consistency. A number of separate two litre portions of the diluted stock were disintegrated and to these were added, in the following order:

(1) 10 ml. of a 4% aqueous solution of a size ("Pexol"), (2) A milled slurry containing either 1.25 g. or 2.5 g. of one of the coated $TiO_2$ pigments prepared as described previously, and (3) 6 ml. of a 10% aqueous alum solution.

Each mixture was then conventionally treated to give a paper of 50 g./sq. meter in a British Standard sheet making machine.

Thus a series of papers were prepared to which additions of 6.25% or 12.5% by weight of the $TiO_2$ pigments had been made which were coated with 0.2%, 0.4%, 0.6%, 0.8% and 1.4% respectively, of the aminated polysaccharide.

A similar process to that just described was carried out but *omitting* the addition of the pigment. A number of two litre portions of diluted disintegrated bleached sulphite and sulphate pulps were prepared and additioned as previously described *except* that the 1.25 g. or 2.5 g. portions of $TiO_2$ pigment in the milled slurry were *uncoated* and the slurries also contained separately-added aqueous aminated polysaccharide solution amounting to 0.2%, 0.4%, 0.6%, 0.8% and 1.4% (by weight on $TiO_2$), respectively. The mixtures were then formed into papers as previously described. The addition of the aqueous aminated polysaccharide solution to the slurry of uncoated pigment caused substantial flocculation of the dispersed pigment particles.

From a knowledge of the amount of pigment in the furnish and from a determination of pigment retained in the paper the Pigment Retention was calculated thus:

Pigment Retention =

$$\frac{\text{Weight pigment}/100 \text{ g. fibre in paper}}{\text{Weight pigment}/100 \text{ g. fibre in furnish}} \times 100$$

The reflectance of the pigmented paper over (a) a black background and (b) a white background is measured by means of a Harrison Colorimeter using a Y filter, and the contrast ratio calculated as previously described.

In addition, the reflectance of the unpigmented paper over a black background was measured. The value obtained gives a measure of the reflectance due to the *fibers* in the paper (as opposed to the pigment particles). The reflectance value of the unpigmented paper was deducted from the reflectance values, obtained over the same black background of the pigmented paper to give the contribution to reflectance of the *pigment* retained in the papers. This reflectance difference in each case was divided by the amount of pigment *retained in the paper*.

From the results of these tests the Contrast Ratio of the paper containing the coated pigment is markedly higher (with a single exception) at *both* 6.25% and 12.5% additions of pigment. The Pigment Retention is at least equivalent, and, particularly at the 12.5% level of $TiO_2$ additions, is markedly superior, in the case of the paper containing the coated $TiO_2$ pigment, to that of the paper to which *uncoated* pigment and aminated polysaccharide were added. The data provide clear indication of the benefits obtained by the use of pigment prepared according to the present invention, particularly at aminated polysaccharide coating levels in excess of about 0.4% (by weight on $TiO_2$).

The product of the present invention is a freely-flowing titanium dioxide pigment having a dried coating of aminated polysaccharide of the characteristics previously described. The aminated polysaccharide is considered to be a "bridging" agent linking the $TiO_2$ particles to the cellulose fiber of the paper pulp, i.e., one end of the molecule is linked to the $TiO_2$ particle and the other to the cellulose fiber, for example by hydrogen bonding. Since the coating of the invention is applied to the pigment particle and the coated particle is then dried, one end of the aminated polysaccharide can be thought of as being very firmly bonded to the pigment particle *before* the $TiO_2$ is dispersed in the pulp. Consequently it is only necessary for *one* end of the aminated polysaccharide chain to link firmly to the cellulose fiber to ensure firm retention of the pigment particle thereon. Apparently, when the pigment particle and the polysaccharide are added separately it is necessary for linking to take place at *both* ends of the polymer chain before the result is achieved. The linking of one end of the polysaccharide chain to the particle is not nearly as firm as when the polysaccharide and the pigment have been heated, i.e., dried together.

Further, the retaining agent, i.e., the polysaccharide in most previous processes is added immediately *before* the formation of the paper sheet and at this stage the titanium dioxide will have already been added and may frequently have undergone some flocculation into aggregates, which limits effective pigment usage. In the process of the present invention, the pigment and associated polysaccharide are added at an earlier stage and it is at this stage that the dispersed pigment is bonded to the cellulose fibers through the polysaccharide thereby giving improved opacity.

Thus, the free-flowing and readily-saleable product of the present invention provide the paper maker with a product which he can used with less trouble and with greater effectiveness than had been possible before, e.g., there is no flocculation of the $TiO_2$ when the latter is mixed with an aqueous mixture containing a polysaccharide. Only a single inventory item is required and only a single addition of a free-flowing pigment is required. The handling and storage of liquid polysaccharide is avoided with no reduction in effectiveness and, indeed, generally significant improvements in effectiveness and final paper properties are obtained.

What is claimed is:

1. Coated titanium dioxide pigment suitable for use in the pigmentation of sheets of cellulosic fibers, said pigment comprising titanium dioxide particles of pigmentary size up to about 0.354 having a dried outer coating consisting essentially of from about 0.25% up to about 5% by weight of an aminated polysaccharide having a molecular weight of at least 750 and containing at least 0.05% amino nitrogen.

2. A coated titanium dioxide pigment as claimed in claim 1 wherein the aminated polysaccharide contains at least 0.1% by weight of nitrogen.

3. A coated titanium dioxide pigment as claimed in claim 1 wherein the aminated polysaccharide contains at least 0.2% by weight of nitrogen.

4. A coated titanium dioxide pigment as claimed in claim 1 wherein the aminated polysaccharide is selected from the group consisting of aminated galacto mannan, aminated starch and aminated cellulose.

5. A coated titanium dioxide pigment as claimed in claim 1 wherein the aminated polysaccharide has a molecular weight of at least 10,000.

6. A coated titanium dioxide pigment as claimed in claim 1 wherein the aminated polysaccharide has a molecular weight of at least 100,000.

7. A coated titanium dioxide pigment as claimed in claim 1 wherein the titanium dioxide particles carry upon their surface an amount of the aminated polysaccharide in the range 1% to 5% by weight.

8. A coated titanium dioxide pigment as claimed in claim 1 wherein the mean weight particle size is in the range 0.15 to 0.35 micron.

9. A coated titanium dioxide pigment suitable for use in the pigmentation of sheets of cellulosic fibers, said pigment comprising titanium dioxide particles of mean weight particle size in the range of about 0.15 to 0.35 micron having a dried outer coating consisting essentially of from about 1% to 5% by weight of an aminated polysaccharide having a molecular weight of at least about 100,000 and containing at least 0.25% by weight of amino nitrogen.

10. In the production of sheets of cellulosic fibers, wherein titanium dioxide pigment and an aminated polysaccharide having a molecular weight of at least 750 and containing at least 0.05% of amino nitrogen are mixed with cellulosic fibers and said cellulosic fiber sheets are prepared therefrom, the improvement which comprises first combining said aminated polysaccharide with said titanium dioxide pigment as a dried coating on the pigment particles prior to admixture of said polysaccharide and titanium dioxide with said cellulosic fibers, said aminated polysaccharide coating comprising at least 0.25% by weight up to about 5% by weight of said dry-coated titanium dioxide pigment.

11. A process in accordance with claim 10 wherein said aminated polysaccharide contains at least 0.1% by weight of amino nitrogen.

12. A process in accordance with claim 10 wherein said aminated polysaccharide contains at least 0.2% by weight of amino nitrogen.

13. A process in accordance with claim 10 wherein said aminated polysaccharide has a molecular weight of at least 10,000.

14. A process in accordance with claim 10 wherein said aminated polysaccharide has a molecular weight of at least 100,000.

15. A process in accordance with claim 10 wherein said aminated polysaccharide has a molecular weight of at least 100,000, contains at least 0.2% by weight of amino nitrogen, and is selected from the group consisting of an aminated galacto mannan, an aminated starch and an aminated cellulose, said aminated polysaccharide coating comprising at least 1% by weight up to about 2.5% by weight of said dry-coated titanium dioxide pigment.

References Cited

UNITED STATES PATENTS

| | | | |
|---|---|---|---|
| 2,136,296 | 11/1938 | Hardy. | |
| 2,935,436 | 5/1960 | Caldwell | 162—175 |
| 2,949,397 | 8/1960 | Werner | 106—300 XR |
| 2,151,019 | 9/1964 | Shildneck et al. | 162—175 |
| 3,205,085 | 9/1965 | Bailin | 106—300 |
| 3,219,519 | 11/1965 | Barber et al. | 162—175 |
| 3,320,118 | 5/1967 | Black et al. | 162—175 |

TOBIAS E. LEVOW, Primary Examiner

H. M. S. SNEED, Assistant Examiner

U.S. Cl. X.R.

106—300, 308; 162—181